United States Patent [19]
Phillips, Jr.

[11] 3,988,271
[45] Oct. 26, 1976

[54] FLAME RETARDANT NYLON COMPOSITION CONTAINING AN ALUMINUM SALT AND AN ALIPHATIC ALCOHOL

[75] Inventor: Richard E. Phillips, Jr., Pensacola, Fla.

[73] Assignee: Monsanto Company, St. Louis, Mo.

[22] Filed: Mar. 3, 1975

[21] Appl. No.: 554,867

[52] U.S. Cl. .................. 260/18 N; 260/33.4 R; 260/78 R; 260/DIG. 24
[51] Int. Cl.$^2$ ............................................. C08J 3/20
[58] Field of Search ........... 260/18 N, 33.4 R, 78 R, 260/DIG. 24

[56] References Cited
UNITED STATES PATENTS

| | | |
|---|---|---|
| 3,400,087 | 9/1968 | Robb et al. .................. 260/18 N |
| 3,755,221 | 8/1973 | Hitch ............................. 260/18 N |

FOREIGN PATENTS OR APPLICATIONS

| | | |
|---|---|---|
| 889,403 | 2/1962 | United Kingdom ............ 260/18 N |

*Primary Examiner*—Eugene C. Rzucidlo
*Attorney, Agent, or Firm*—R. Bruce Blance; Edward P. Grattan; James C. Logomasini

[57] ABSTRACT

A polyamide molding composition having good flame-retardant and mold release characteristics that comprises a polyamide and from 500 to 5000 parts per million each of a $C_{12}$ to $C_{20}$ aliphatic alcohol and an aluminum salt of a $C_{12}$ to $C_{20}$ fatty acid such that the ratio of the parts of salt to the parts of alcohol is at least 1.0.

8 Claims, No Drawings

FLAME RETARDANT NYLON COMPOSITION CONTAINING AN ALUMINUM SALT AND AN ALIPHATIC ALCOHOL

BACKGROUND OF THE INVENTION

This invention relates to polyamide compositions having improved flame retardant properties.

This use of polyamide resins in molding compositions has become very widespread in recent years especially in end uses where toughness and high temperature stability are required properties. Speciality polyamide resins containing a variety of filler materials have been widely used in a range of automotive applications for example and other polyamides have been successfully introduced into the electrical, appliance and consumer goods fields.

Where the end-use requires a molding composition, it is a common practice in the art to treat the resin with a small amount of a mold release agent and one such agent, among the many described in the literature, is stearyl alcohol (disclosed in British Pat. No. 851,031). Unfortunately it has been found that the use of such alcohols has a deleterious effect on the flammability of the nylon and this is becoming, for many uses, a vital factor in achieving customer acceptability. It is also known that aluminum salts of fatty acids can be used as lubricants for polyamides and alumnium stearates are widely used for this purpose.

It has now been discovered that a certain combination of such mold release and lubricant additives not only provides the expected desirable mold release improvements in the polyamide but also gives a product that, surprisingly and unpredictably, has also good flame-retardant characteristics.

SUMMARY

The present invention provides a polyamide molding composition having good flame-retardant and mold release characteristics that comprise a polyamide and from 500 to 5000 parts per million each of a $C_{12}$ to $C_{20}$ aliphatic alcohol and an aluminum salt of a $C_{12}$ to $C_{20}$ fatty acid such that the ratio of the parts of salt to the parts of alcohol is at least 1.0.

The total additive (salt plus alcohol) is preferably maintained at from 1000 to 5000 ppm and more usually at from 1,500 to 3,000 ppm, though amounts outside these ranges may occasionally be required.

The alcohol is one having from 12 to 20 carbon atoms such as lauryl alcohol, cetyl alcohol, stearyl alcohol, myristyl alcohol, and eicosyl alcohol. Of these the preferred alcohol is stearyl alcohol on account of its ready availability.

The aluminum salt can be any of the fatty acid salts of aluminum having from 12 to 20 carbon atoms, that is it can be the mono-, di- or tri-acid derivative. In practice, however, the salt preferred is the di-acid salt. The fatty acid from which the salt is derived can be for example lauric acid, myristic acid, palmitic acid, stearic acid or eicosoic acid. Of these alternatives the diacid salts are preferred and particularly aluminum dipalmitate, aluminum distearate and aluminum dieicosoate.

The polyamide can be any of those known as nylons such as for example nylon 6, nylon 6/6, nylon 6/9, nylon 6/10, nylon 6/12 as well as copolymers such as nylon 6, 6/6 and nylon 6, 6/12. The preferred nylon is, however, nylon 6, nylon 6/6 or a copolymer of nylon 6 and nylon 6/6.

PREFERRED EMBODIMENT

The present invention is further illustrated by the following Examples which demonstrate the effect of varying additive amounts on the flammability of a commercially available nylon 6/6 polymer as assessed by the UL-94 test applied to a strip of the polymer one thirty-second of an inch in thickness. All amounts given herein are in parts per million. The additives were surface coated on the sample to be tested. Samples rated HB had unsatisfactory flammability characteristics while those having V2 rating are considered to meet the required level of performance. Examples 1-10 are for purposes of comparison only.

| EXAMPLE | TOTAL LUBRICANT LEVEL (PPM) | STEARYL ALCOHOL (PPM) (1) | ALUM. DISTEARATE (PPM) (2) | RATIO OF (2) to (1) | UL-94 RATING |
| --- | --- | --- | --- | --- | --- |
| 1 (C) | 0 | 0 | — | — | V2 |
| 2 (C) | 1000 | 0 | 1000 | — | V2 |
| 3 (C) | 2000 | 2000 | 0 | — | HB |
| 4 (C) | 3000 | 3000 | 0 | — | HB |
| 5 (C) | 3000 | 2000 | 1000 | 0.5 | HB |
| 6 (C) | 4000 | 4000 | 0 | — | HB |
| 7 (C) | 4000 | 3000 | 1000 | 0.33 | HB |
| 8 (C) | 5000 | 5000 | 0 | — | HB |
| 9 (C) | 5000 | 4000 | 1000 | 0.25 | HB |
| 10 (C) | 5000 | 3000 | 2000 | 0.67 | HB |
| 11 | 2000 | 1000 | 1000 | 1.0 | V2 |
| 12 | 3000 | 1000 | 2000 | 2.0 | V2 |
| 13 | 4000 | 2000 | 2000 | 1.0 | V2 |
| 14 | 4000 | 1000 | 3000 | 3.0 | V2 |
| 15 | 5000 | 2500 | 2500 | 1.0 | V2 |
| 16 | 5000 | 2000 | 3000 | 1.5 | V2 |
| 17 | 5000 | 1000 | 4000 | 4.0 | V2 |

Compositions containing no stearyl alcohol were found to have poor mold release characteristics and all containing stearyl alcohol performed well in this respect.

The polyamide compositions of the invention can if desired incorporate other additives such as fillers, whether in fibrous or granular form, antioxidants, stabilizers, coloring materials, anti-static additives, and the like without materially affecting the applicability of the invention disclosed herein.

It is foreseen that minor variations could be made in the polyamide compositions specifically described herein without materially affecting their effectiveness for the purpose specified. It is intended that all such variations shall be included within the purview of this invention.

What is claimed is:

1. A composition of matter having improved flame retardant and mold release characteristics, comprising a nylon polyamide and from 500 to 5000 ppm each of a $C_{12}$ to $C_{20}$ aliphatic alcohol and an aluminum salt of a $C_{12}$ to $C_{20}$ fatty acid such that the ratio of the parts of salt to the parts of alcohol is at least 1.0.

2. A composition according to claim 1 wherein the total amount of alcohol and salt in the composition is from 1000 to 5000 ppm.

3. A composition according to claim 1 comprising from 1,000 to 3,000 ppm of the aluminum salt.

4. A composition according to claim 1 comprising from 1000 to 2000 ppm of the alcohol.

5. A composition according to claim 1 wherein the aluminum salt is aluminum stearate.

6. A composition according to claim 1 wherein the alcohol is stearyl alcohol.

7. A composition according to claim 1 wherein the polyamide is nylon 6/6.

8. A composition of matter comprising nylon 6/6, from 1000 to 2000 ppm of stearyl alcohol and from 1000 to 3000 ppm of aluminum stearate, the ratio of aluminum stearate to stearyl alcohol being from 1:1 to 3:1.

* * * * *